United States Patent [19]

Schramm et al.

[11] Patent Number: 5,053,580
[45] Date of Patent: Oct. 1, 1991

[54] METAL OXIDE POWDERS, THEIR MIXTURES, METAL MIXED OXIDE POWDERS, THEIR MIXTURES AND THEIR USE IN CATALYTIC DEHYDROGENATION OF HYDROCARBONS

[75] Inventors: Bernhard Schramm, Heidelberg; Jurgen Kern, Bammental; Harald Schwahn, Wiesloch; August-Wilhelm Preuss, Dorsten; Klaus Gottlieb, Herdecke; Hartmut Bruderreck, Borken, all of Fed. Rep. of Germany

[73] Assignee: Veba Oel Aktiengesellschaft, Gelsenkirchen, Fed. Rep. of Germany

[21] Appl. No.: 520,375

[22] Filed: May 7, 1990

Related U.S. Application Data

[62] Division of Ser. No. 372,358, filed as PCT DE88/00683 on Nov. 5, 1988, published as WO89/04717 on Jun. 1, 1989, Pat. No. 5,013,706.

[30] Foreign Application Priority Data

Nov. 17, 1987 [DE] Fed. Rep. of Germany ....... 3739002

[51] Int. Cl.⁵ .......................... C07C 5/09; C07C 5/373; C07C 2/02; C07C 5/333
[52] U.S. Cl. .................... 585/624; 585/505; 585/506; 585/629; 585/630; 585/631; 585/658; 585/662
[58] Field of Search ............... 585/624, 630, 658, 662, 585/629, 505, 506, 631

[56] References Cited

U.S. PATENT DOCUMENTS

| | | |
|---|---|---|
| 2,500,482 | 3/1950 | Barter . |
| 4,108,919 | 8/1978 | Hoppstock et al. ............... 585/624 |
| 4,152,300 | 5/1979 | Riesser ............................. 585/629 |
| 4,327,238 | 4/1982 | Eastman ........................... 585/629 |
| 4,368,344 | 1/1983 | Kolts ................................ 585/629 |
| 4,450,313 | 5/1984 | Eastman et al. ................. 585/661 |
| 4,472,513 | 9/1984 | Menger-Hammond et al. ... 502/150 |
| 4,476,344 | 10/1984 | Kimble ............................. 585/662 |
| 4,644,089 | 2/1987 | Lee .................................. 585/629 |

FOREIGN PATENT DOCUMENTS

| | | |
|---|---|---|
| 0128302 | 12/1984 | European Pat. Off. . |
| 0202911 | 11/1986 | European Pat. Off. . |
| 2633959 | 9/1977 | Fed. Rep. of Germany . |

Primary Examiner—Helen M. S. Sneed
Assistant Examiner—James Saba
Attorney, Agent, or Firm—Oblon, Spivak, McClelland, Maier & Neustadt

[57] ABSTRACT

Metal oxide powders comprised of Cr(III) oxide, Ti(IV) oxide, V(V) oxide, or mixtures of these, or metal mixed oxides comprised of Cr(III) oxide and Ti(IV) oxide and V(V) oxide, or their mixtures. They have BET surfaces of 5–50 m²/g and mean particle diameters of 25–350 nm and are useful to increase conversion and selectivity in the manufacture of mono-olefins by catalytic dehydrogenation of saturated hydrocarbons. The metal oxide powders are produced from mixtures of the vaporized metal compounds chromyl chloride, titanium tetrachloride, and vanadyl chloride, in the presence of certain gases by laser pyrolysis.

11 Claims, 4 Drawing Sheets

METAL OXIDE POWDERS, THEIR MIXTURES, METAL MIXED OXIDE POWDERS, THEIR MIXTURES AND THEIR USE IN CATALYTIC DEHYDROGENATION OF HYDROCARBONS

This is a division, of application Ser. No. 07/372,358, filed as PCT DE88/00683 on Nov. 5, 1988, published as WO89/04717 on Jun. 1, 1989, now Pat. No. 5,013,706.

FIELD OF THE INVENTION

The invention relates to metal oxide powders, their mixtures, metal mixed oxide powders, their mixtures, and use of these in catalytic dehydrogenation of branched or unbranched, saturated or unsaturated hydrocarbons having 2-6 C atoms, or in catalytic dehydrogenation of mixtures of such hydrocarbons, at a temperature of 300°-700° C. and a pressure of 0.1-20 bar, possibly in the presence of hydrogen, steam, oxygen, or mixtures of hydrogen, steam, and/or oxygen.

BACKGROUND OF THE INVENTION

The catalytic dehydrogenation of hydrocarbons, particularly short chain hydrocarbons with 2-6 C atoms, is carried out in known fashion, by passing the hydrocarbons adiabatically through fixed bed reactors, in either pure form or diluted with an inert gas. A plurality of fixed bed reactors operated in parallel may be used. In general the dehydrogenation catalyst is comprised of aluminum oxide with additives such as, e.g., chromium oxide or other metal oxides or mixtures of same (see Ger. OSs 36 14 854 and 36 20 481, and U.S. Pat. Nos. 2,943,067 and 2,419,997).

Such metal oxides are prepared, e.g., with aqueous ammonia solution. Often suitable solutions of metal salts are applied onto support materials such as aluminum oxide.

About 8 years ago, various groups of researchers undertook the study of ceramic powders produced by a novel method, wherein suitable gaseous starting compounds were reacted under $CO_2$ laser irradiation to form pulverulent solids.

The powders formed have the following properties: Small particle diameter, uniform shape, narrow particle size distribution, high purity, low degree of agglomeration, and high surface activity (see *J. Am. Ceramic Soc.*, 65, 7:324 ff.).

In U.S. Pat. No. 4,343,687, among other things the production of metal oxide powders by irradiating suitable starting compounds with a pulsed IR laser of a frequency not absorbed by the reaction mixture is described. The resulting products are said to be suitable for catalytic purposes. According to this method, e.g., a $Cr_2O_3$ powder is produced on a support, in a closed static cell, by a laser-induced reaction between chromyl chloride ($CrO_2Cl_2$) as the oxidant and hydrogen as the reaction partner, wherewith the reaction is initiated by at least one laser pulse of 2 $J/cm^2$.

SUMMARY OF THE INVENTION

An underlying object of the present invention is to devise means of producing new metal oxide powders comprised of Cr(III) oxide, Ti(IV) oxide, V(V) oxide, or mixtures of these, and new metal mixed oxides comprised of Cr(III) oxide and Ti(IV) oxide, Cr(III) oxide and V(V) oxide, or Ti(IV) oxide and V(V) oxide, or their mixtures, which have advantageous properties. A second underlying problem is to increase the conversion and selectivity of the manufacture of mono-olefins by the catalytic dehydrogenation of saturated hydrocarbons, with the aid of the abovementioned compounds or mixtures of said compounds.

These problems are solved by the inventive metal oxide powders or their mixtures and by the use of the inventive powders as dehydrogenation catalysts.

The claimed metal oxide powders of the invention include novel metal mixed oxide powders comprised of Cr(III) oxide and Ti(IV) oxide, Cr(III) oxide and V(V) oxide, or Ti(IV) oxide and V(V) oxide, or their mixtures. These novel metal mixed oxide powders are distinguished from simple mixtures of the commercially available individual oxides, and are even distinguished from mixtures of individual metal oxide powders which individual metal oxide powders have been prepared according to the invention, namely, mixtures of Cr(III) oxide, Ti(IV) oxide, and V(V) oxide individually, having a BET surface of 5-50 $m^2/g$ and average particle diameter 25-350 nm. The novel metal oxide powders are prepared from vaporized metal compounds, namely chromyl chloride, titanium tetrachloride, and vanadyl chloride and the novel metal mixed oxide powders are prepared from mixtures of said vaporized metal compounds.

The metal oxide powders and metal mixed oxide powders are prepared from said vaporized volatile metal compounds in the presence of a noble gas or hydrogen, nitrogen, sulfur hexafluoride, or oxygen, or some mixture of these gases, with the method of preparation being continuous laser pyrolysis at 10-1000 mbar.

The invention further includes the use of the above-described metal mixed oxide powders or their mixtures, and the use of a representative of the group comprised of Cr(III) oxide, Ti(IV) oxide, and V(V) oxide, or a mixture of these, for catalytic dehydrogenation of branched or unbranched, saturated or unsaturated hydrocarbons with 2-6 C atoms, or mixtures of such hydrocarbons, at a temperature of 300°-700° C. and a pressure of 0.1-20 bar.

Preferably the catalytic dehydrogenation is carried out in the presence of hydrogen, steam, oxygen, or a mixture of these.

It is also preferred to use the inventive metal mixed oxide powders or their mixtures, and the inventive metal oxide powders or their mixtures, for catalytic dehydrogenation of the aforesaid hydrocarbons, wherein the dehydrogenation is carried out in the presence of aluminum hydroxide powder in the amount of up to 90 wt. %, wherein the materials are used in the form of molded bodies produced with a binding agent.

DETAILED DESCRIPTION OF THE INVENTION

Figure 1:
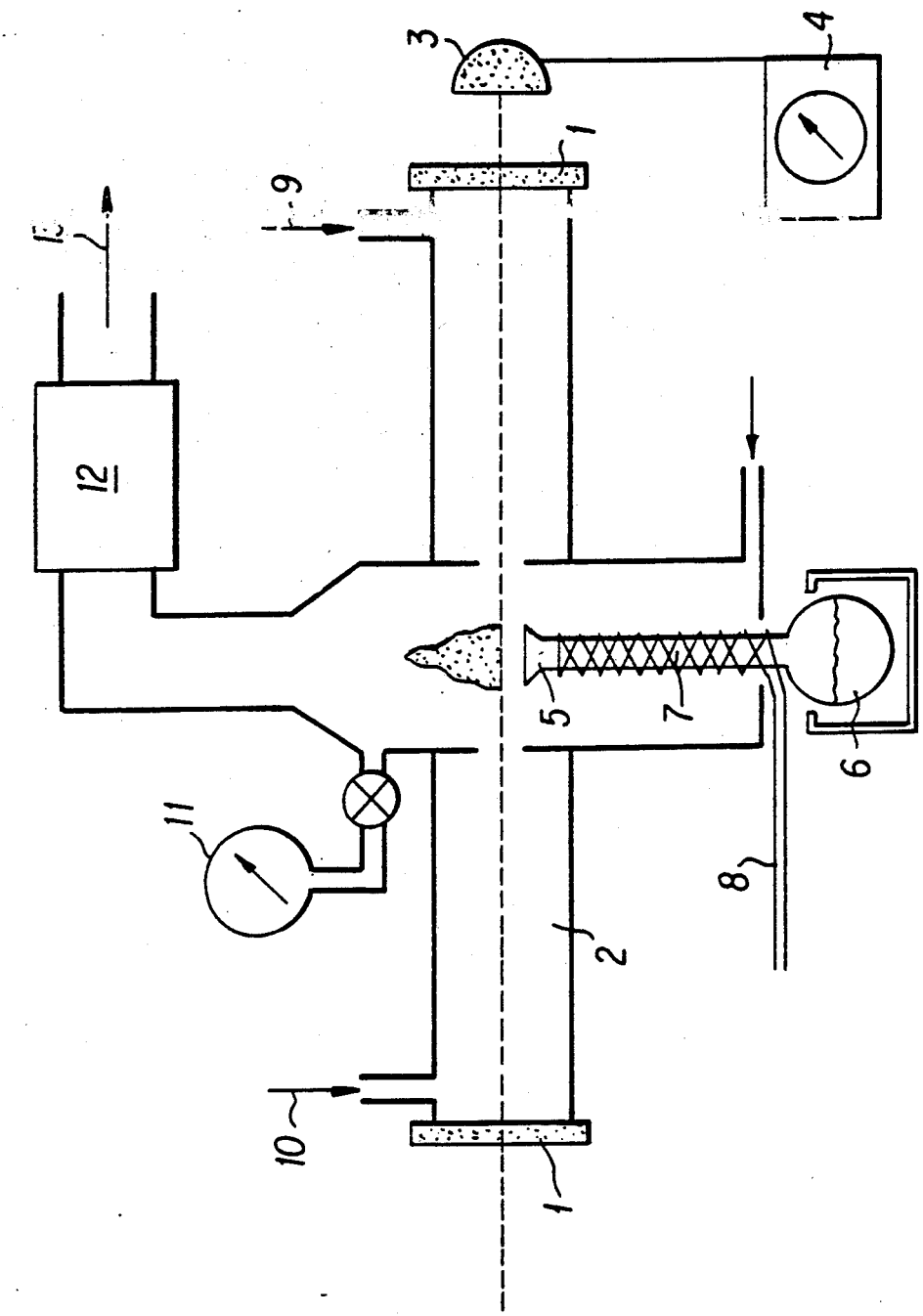
FIG. 1 shows an apparatus suitable for the preparation of the metal oxide powders.

The apparatus (FIG. 1) employed for decomposing the gaseous starting compounds and separating out the resulting solid products, such as Ti(IV) oxide ($TiO_2$), V(V) oxide ($V_2O_5$), and Cr(III) oxide ($Cr_2O_3$), and metal mixed oxide powders, is comprised of glass material. The laser beam enters the cell 2 through NaCl windows 1, passes out through such windows 1, and arrives finally at a detector 3 having a power-measuring device 4. The $CO_2$ laser employed has an emission spectrum comprising more than 200 lines.

The $CO_2$ continuous laser has an efficiency of 15%, and delivers 75–85 W at the 984 $cm^{-1}$ line, c. 100 W at 945 $cm^{-1}$, and c. 75 W at 1042 $cm^{-1}$. At 80 W total power, the power density without focusing is c. 3,000 $W/cm^2$, and is c. 30,000 $W/cm^2$ with focusing.

The gaseous products flow out through a slit-shaped nozzle 5 or a round nozzle, in a direction perpendicular to the laser beam. Prior to the reaction, the starting compounds are cooled in a reservoir flask 6 by dry ice and methanol, to prevent premature evaporation. During the reaction, the flask must be gently heated. The feed tube 7 to the nozzle is heated with a heating wire 8 to prevent condensation of the starting compound.

The diameter of the laser beam when unfocused is c. 2 mm; focused 0.5–0.7 mm.

A gas stream comprised of a noble gas, hydrogen, nitrogen, sulfur hexafluoride, or oxygen, or a mixture of these, is passed around the nozzle in order to ensure laminar flow of the educts and products and/or to influence the reaction. The supplementary gas is introduced at the NaCl windows via pipes 9 and 10, to prevent soiling of the windows by the powder produced in the laser pyrolysis. The total pressure, registered on a manometer 11, is maintained typically at 50 mbar by regulating the pumping rate. A reaction can be achieved with total pressure in the range 10–1000 mbar.

The powder is collected on a membrane filter or in a fiber filter 12. Condensable gases and unconverted material are condensed out in cold traps 13 downstream of the filter, and are either subsequently discarded or are processed for reuse.

The laser beam may be focused on a point above the nozzle, using a ZnSe focusing lens with focal length f=30 cm, or a NaCl focusing lens with focal length f=20 cm. To increase the yield, a multipass cell may be used, wherein the flow of the starting compound is passed a number of times perpendicularly to the laser beam. The same purpose is served by a cell wherein the laser beam passes four times through the same region above the nozzle, in the horizontal plane, by means of four entrance openings arranged in the form of a cross.

The invention will be described in more detail hereinbelow, and tests of formation of $Cr_2O_3$ powder, $TiO_2$ powder, and $V_2O_5$ powder will be described.

DESCRIPTION OF THE PREFERRED EMBODIMENTS

The decomposition of titanium tetrachloride ($TiCl_4$) is carried out in an argon-oxygen stream, in the above-described apparatus. $TiCl_4$ absorbs at 984 $cm^{-1}$. The absorption of $TiCl_4$ at this line and elsewhere in the emission range of the $CO_2$ laser is low. If the reservoir flask is heated strongly, a reaction is attained, with powder formation and a bright pink-violet flame. The yield is a few percent.

X-ray diffractometry shows that the reaction product is comprised of the two titanium dioxide forms, rutile and anatase.

Transmission electron micrographs (TEM) show that the $TiO_2$ particles produced have mean particle size 25 nm, and a very narrow particle size distribution.

The decomposition of vanadyl chloride ($VOCl_3$) is also carried out in the above-described apparatus. The exposure is effected at a P-line of the laser at 1042 $cm^{-1}$. $VOCl_3$ absorbes the $CO_2$ laser radiation better than $TiCl_4$, but still to a much lesser degree than $CrO_2Cl_2$. In an argon-oxygen stream it is possible to achieve a continuous reaction with formation of powder and a pale yellow flame. The yield of yellowish-brown $V_2O_5$ is only a few percent, however. Diffractometry shows that the $V_2O_5$ produced is X-ray amorphous. It is not possible to achieve decompositions on other lines.

Heretofore attempts to achieve a continuous reaction in an argon-hydrogen stream have not succeeded. A weak reaction is produced, with only a small, pale flame, yielding a small amount of black V(III) oxide, at a yield of <1%.

$CrO_2Cl_2$ has proved to be the most suitable readily vaporizable chromium compound for producing catalytic $Cr_2O_3$. Thermal decomposition of $CrO_2Cl_2$ by conventional methods at temperatures up to 380° C. leads principally to Cr(IV) oxide. Increasing the temperature to above 400° C. leads to a stabile Cr(III) oxide, with loss of oxygen.

The $CO_2$ laser line at 984 $cm^{-1}$ is the most suitable for decomposing $CrO_2Cl_2$, but pyrolysis is also possible on neighboring lines.

If sulfur hexafluoride ($SF_6$) is used as a carrier gas, the irradiation can be carried out to form $Cr_2O_3$ even at the 945 $cm^{-1}$ absorption band of $SF_6$. However, if a carrier gas other than $SF_6$ is used, $CrO_2Cl_2$ does not decompose under irradiation by $CO_2$ laser light of wavelength 945 $cm^{-1}$.

The $CrO_2Cl_2$ vapor absorbs 2–8 W of the laser power applied.

The $CrO_2Cl_2$ partial pressure is 2–10 mbar.

Depending on the system conditions, 1.5–12 g $Cr_2O_3$ per hr can be synthesized.

The flame was orange when decomposing $CrO_2Cl_2$ with a noble gas, nitrogen, oxygen, or $SF_6$ as the carrier gas. Depending on conditions, flame size was 3–20 mm and began 2–4 mm above the nozzle.

In the tests with pure hydrogen, the flame burned only very irregularly, with a luminous bright yellow color, and began right at the nozzle opening or even inside the nozzle. Accordingly, it was difficult to achieve a long continuous run with powder production.

It was possible to achieve smooth operation for an extended time if the hydrogen was diluted with argon in a volumetric ratio of 1:8.

In studies with hydrogen and argon, it was possible to convert nearly 100% of the chromyl chloride. With argon alone, or nitrogen or oxygen, maximum conversions were only 45–70%. In studies with $SF_6$ as a carrier gas and absorber of the laser radiation, only 30% of the $CrO_2Cl_2$ was converted. With helium as a carrier gas, the yield was reduced to c. 20%.

Radiation from a continuous laser of, e.g., 100–1000 W is continuously absorbed directly in the gaseous metal compounds, e.g. $CrO_2Cl_2$, or in an energy transferring gas, e.g. $SF_6$, whereby the chemical reaction to form the novel oxides or oxide mixtures is brought about.

Because the chemical reaction is in fact maintained by the laser radiation, the course of the reaction can be controlled to produce a finer or coarser powder, or even a powder with more or fewer fault locations in the crystal lattice of the metal oxides or metal mixed oxides.

The BET method is used to determine the specific surface of the $Cr_2O_3$ powder product. Commercial $Cr_2O_3$ has a specific surface of 2–3 sq m/g. All powders produced according to the described method have specific surfaces 5–20 times greater than this.

The $Cr_2O_3$ product was characterized with the aid of the Guinier X-ray method. The lines on the film strips indicated the same elementary cell with the same dimensions and with the same line sensitivity ratios as commercial $Cr_2O_3$. Samples from experiments with hydrogen and/or argon had particle sizes clearly below 100 nm based on TEM examination. Accordingly, lines which were broadened and blurred were observed in the Guinier spectrum.

X-ray diffractometry and X-ray fluorescence analysis showed that the powders produced are comprised of very pure $Cr_2O_3$. The only appreciable impurity detected was the element chlorine, present at the low concentration of 400–1500 ppm. The samples with $SF_6$ as a carrier gas and absorber gas contained only traces of sulfur (20 ppm).

Figure 2:
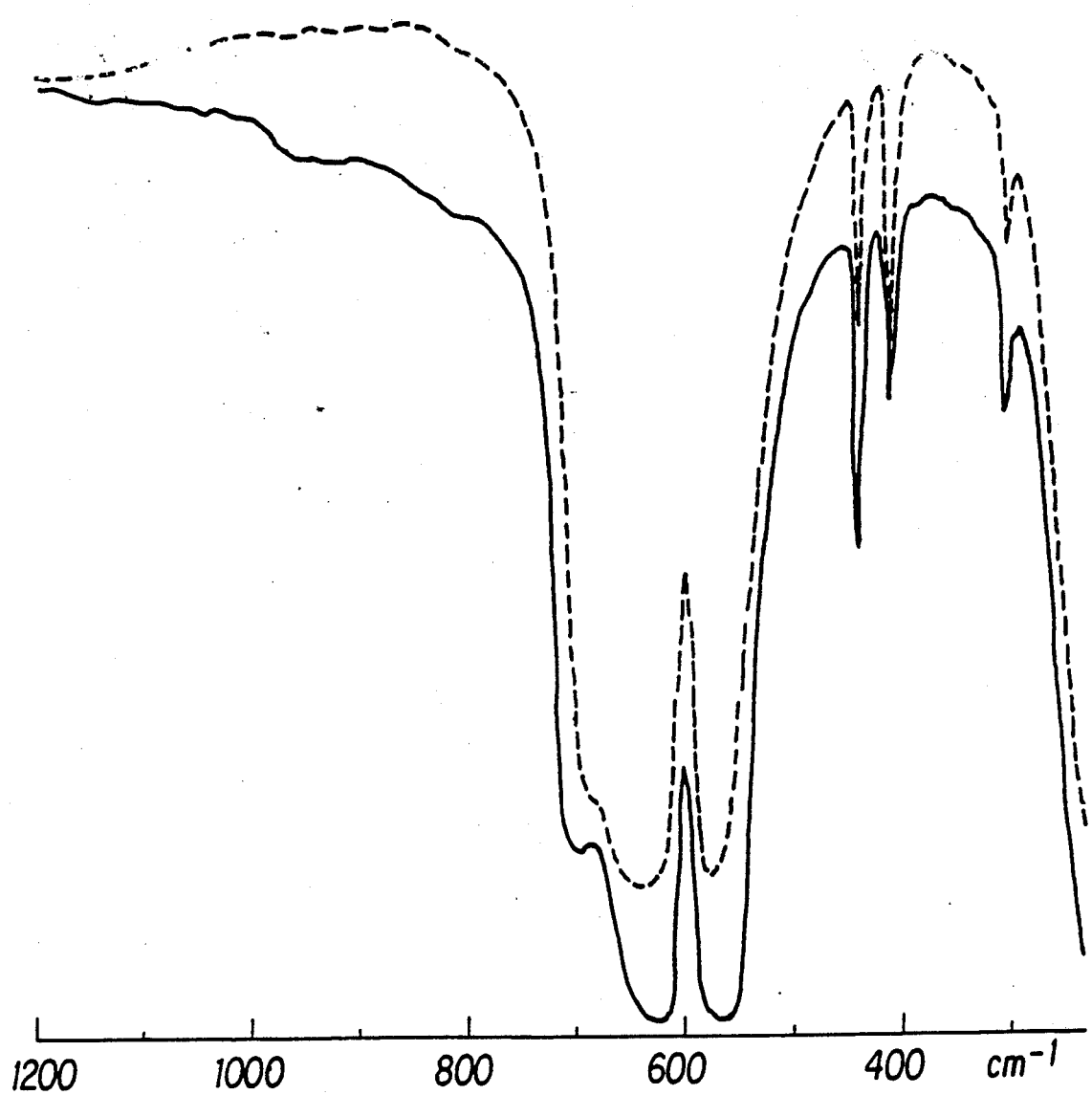
FIG. 2 is an IR spectrum of $Cr_2O_3$ of the invention and of commercial $Dr_2O_3$.

IR spectroscopy also showed that the $Cr_2O_3$ product produced according to the invention was very pure (see FIG. 2). (KEY to FIG. 2: — = $Cr_2O_3$ according to the invention; ---- = commercial $Cr_2O_3$.)

Studies by scanning electron microscope (SEM) and TEM showed a narrow particle size distribution. The mean particle size of the various $Cr_2O_3$ powders was between 50 and 350 nm, whereas that of commercial $Cr_2O_3$ was found to be 800 nm.

Electron spin resonance (ESR) showed that all the inventively synthesized powders have different magnetic behavior than commercial $Cr_2O_3$.

The inventive mixed oxides are prepared as follows: The vaporized starting compounds are irradiated with a continuous $CO_2$ laser of variable frequency, wherein either the starting compound absorbs the laser energy or $SF_6$ serves as an absorbing auxiliary gas. The conversion may be carried out in a continuous operation comprised of a plurality of stages. The gases generated are continuously pumped off, and the powder produced is captured in filters.

In studies on the production of mixed oxides or mixtures of oxides a single reservoir flask was employed which was divided into two chambers. Each chamber was capable of being individually heated, in order to adjust the partial pressure of the starting compound in it to the desired value. Thereby the mixing ratio of the gases could be freely adjusted. During the reaction, the reservoir flask must be gently heated. The two vaporized compounds then flow out through a common nozzle and through the laser beam.

To produce a mixed $Cr_2O_3/TiO_2$ oxide by this method, $CrO_2Cl_2$ and $TiCl_4$ are simultaneously vaporized, using a noble gas as a carrier, and are converted in the laser beam. Other carrier gases such as, e.g., nitrogen, oxygen, or steam, may also be used. The $CrO_2Cl_2$ supplies the oxygen for forming the $TiO_2$.

The irradiation is carried out on the common 984 $cm^{-1}$ absorption line of $CrO_2Cl_2$ and $TiCl_4$. It is also possible to carry out pyrolysis with neighboring laser lines.

Under these conditions it is possible to achieve a continuous reaction with powder production and with a flame which corresponds to that obtained in the decomposition of pure $CrO_2Cl_2$. Reaction is not possible on other lines of the $CO_2$ laser.

As a result of the arbitrarily adjustable gas composition, oxides with a wide range of mixture ratios can be produced. With a mixture ratio of, e.g., 3:1 for $CrO_2Cl_2$:$TiCl_4$, a mixed oxide is obtained in an overall yield of c. 80%.

X-ray fluorescence analysis indicates Cr and Ti as chief constituents of the mixed oxide.

Figure 3:
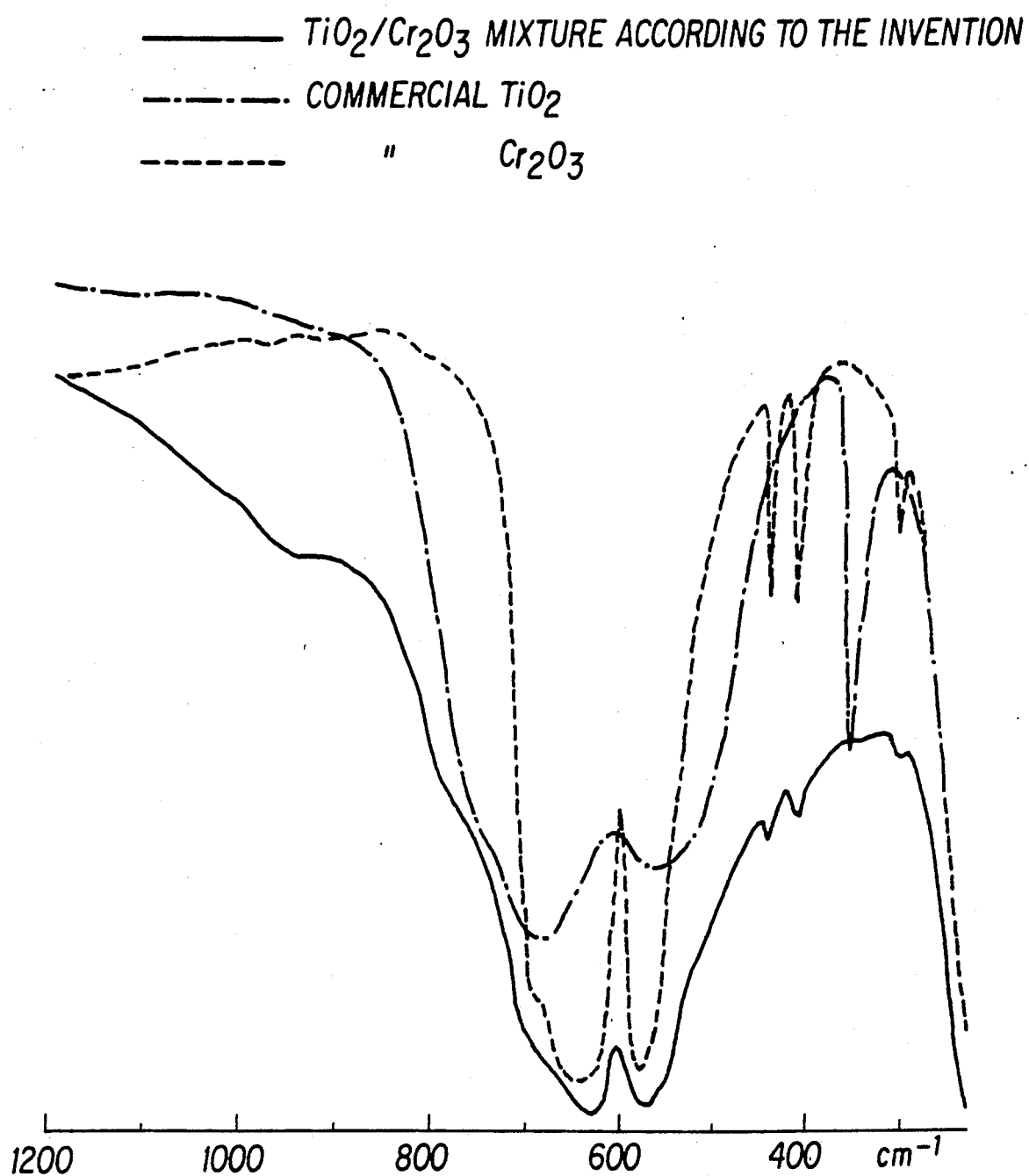
FIG. 3 sis an IR spectrum of $TiO_2/Cr_2O_3$ according to the invention and of commercial $TiO_2$ and $Cr_2O_3$.

The IR spectrum (FIG. 3) shows characteristic bands at 1200 to 300 $cm^{-1}$, and clearly shows that the novel mixed oxide of $Cr_2O_3$ and $TiO_2$ has a different structure than that of commercial $Cr_2O_3$ and commercial $TiO_2$, as well as a different structure than that of the mixture of inventive $Cr_2O_3$ and inventive $TiO_2$. (KEY to FIG. 3: — = mixture of $TiO_2$ and $Cr_2O_3$ according to the invention; —·—·— = commercial $TiO_2$; --- = commercial $Cr_2O_3$.)

Figure 4:
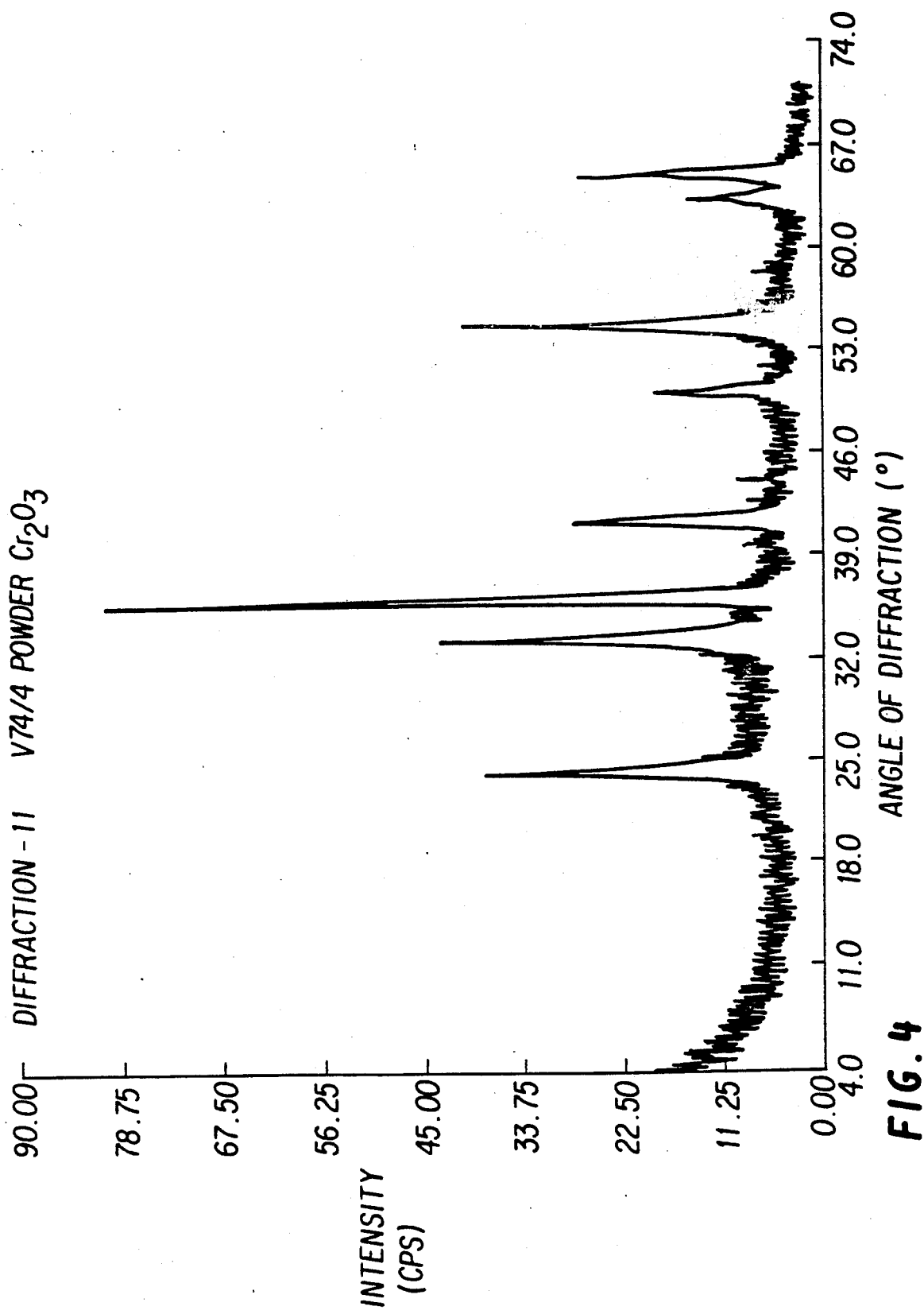
FIG. 4 is an X-ray diffraction of $TiO_2/Cr_2O_3$ according to the invention.

X-ray diffractometry (FIG. 4) clearly shows widened bands associated with $Cr_2O_3$. No bands corresponding to any $TiO_2$ modification appear. This indicates that Ti atoms have been substituted for Cr atoms in the $Cr_2O_3$ lattice. (KEY to FIG. 4: (a) Intensity, cps; (b) Angle of diffraction, degrees.)

To produce mixtures of $Cr_2O_3$ and $TiCl_4$, one converts $CrO_2Cl_2$ and $VOCl_3$ simultaneously in the laser beam, with a noble gas again being used as a carrier gas.

According to the invention, the conversion and yield are increased in the dehydrogenation of saturated hydrocarbons having a small number of C atoms, when one employs metal mixed oxide powders produced by laser pyrolysis, or mixtures of such mixed oxide powders, or metal oxide powders thus produced, or mixtures of such metal oxide powders. This has been confirmed by experiment.

In the example set forth hereinbelow, molded bodies produced from inventively manufactured $Cr_2O_3$ were employed to increase yields and conversions in the dehydrogenation of isobutane, in comparison to the results when commercially marketed $Cr_2O_3$ was employed as the catalyst substance.

EXAMPLES a) Isobutane was passed at 593° C. and 300 mbar through a tubular reactor in which a fixed bed of catalyst was disposed. The reaction was carried out for 10 min in each case. The catalyst loading was 2 g isobutane per gram catalyst per hr.

The catalyst bed was comprised of a prescribed amount of catalyst pellets each having dimensions c. 3×4 mm. The pellets were dried for several hours at 150° C., followed by calcination 3 hr at 550° C.

Following the reaction, nitrogen purging was carried out. The catalyst was then regenerated by roasting in a nitrogen-oxygen mixture.

The reaction products were analyzed by GC at the outlet of the reactor. The carbon which separated out on the catalyst was determined as $CO_2$ in an IR analyzer by roasting the catalyst in air.

Experiment aA (Comparison example)

Conventionally produced commercial $Cr_2O_3$:
Feed: Isobutane 99.9 wt. %.
Results of GC and IR analyses at the reactor outlet:

| GC Analysis | |
|---|---|
| Methane | 0.09 wt. % |
| Propane | 0.01 wt. % |
| ?·ene | 0.20 wt. % |

| -continued | |
|---|---|
| Isobutane | 99.09 wt. % |
| n-Butane | 0.01 wt. % |
| Isobutene | 0.57 wt. % |
| H$_2$ | 0.02 wt. % |
| IR Analysis | |
| Carbon | 0 wt. % |
| Conversion: | 1 mol % |
| Selectivity: | 73 mol % |
| Yield: | 1 mol % |

Experiment aB

Cr$_2$O$_3$ produced by laser pyrolysis in a hydrogen-and-noble-gas mixture employed as a carrier gas:
Feed: Isobutane 99.9 wt. %.
Results of GC and IR analyses at the reactor outlet:

| GC Analysis | |
|---|---|
| Methane | 0.92 wt. % |
| Ethane | 0.28 wt. % |
| Ethene | 0.16 wt. % |
| Propane | 0.41 wt. % |
| Propene | 1.11 wt. % |
| Isobutane | 58.23 wt. % |
| n-Butane | 0.09 wt. % |
| 1-Butene | 0.15 wt. % |
| Isobutene | 33.84 wt. % |
| trans-2-Butene | 0.28 wt. % |
| cis-2-Butene | 0.19 wt. % |
| 1,3-Butadiene | 0.14 wt. % |
| Hydrocarbons with >5 C atoms | 0.12 wt. % |
| H$_2$ | 1.88 wt. % |
| CO | 0.7 wt. % |
| IR Analysis | |
| Carbon | 1.53 wt. % |
| Conversion: | 42 mol % |
| Selectivity: | 84 mol % |
| Yield: | 35 mol % | b) Isobutane was dehydrogenated in the same apparatus as in (a), and again at 593° C. and 300 mbar, with reaction time 10 min. However, here the catalyst loading was only 0.5 g isobutane per gram catalyst per hour.

The catalyst bed was comprised of pellets produced as follows:

15 parts by wt. chromium oxide powder was mixed thoroughly with 85 parts by wt. aluminum hydroxide. 2.5 parts by wt. sodium silicate solution was added to 97.5 parts by wt. of this mixture. Additional water was added to form a brushable paste.

Molded bodies (pellets) 3×4 mm each were produced from this paste. These were dried several hours at 150° C., and were then calcined 3 hr at 550° C.

The regeneration of the catalyst and the analyses of the reaction products were performed analogously to (a), supra.

Experiment bA (Comparison example)

Conventionally produced commercial Cr$_2$O$_3$:
Feed: Isobutane 99.9 wt. %.
Results of GC and IR analyses at the reactor outlet:

| GC Analysis | |
|---|---|
| Ethene | 0.18 wt. % |
| Methane | 2.83 wt. % |
| Propane | 0.11 wt. % |
| Propene | 1.87 wt. % |
| Isobutane | 84.65 wt. % |
| 1-Butene | 0.11 wt. % |
| Isobutene | 7.4 wt. % |

| -continued | |
|---|---|
| trans-2-Butene | 0.08 wt. % |
| cis-2-Butene | 0.06 wt. % |
| H$_2$ | 1.82 wt. % |
| CO | 0.36 wt. % |
| CO$_2$ | 0.1 wt. % |
| 1,3-Butadiene | 0.04 wt. % |
| IR Analysis | |
| Carbon | 0.44 wt. % |
| Conversion: | 15 [mol %] |
| Selectivity: | 50 [mol %] |
| Yield: | 8 [mol %] |

Experiment bB

Cr$_2$O$_3$ produced by laser pyrolysis in argon employed as a carrier gas:
Feed: Isobutane 99.9 wt. %.
Results of GC and IR analyses at the reactor outlet:

| GC Analysis | |
|---|---|
| Methane | 1.27 wt. % |
| Ethane | 0.28 wt. % |
| Ethene | 0.15 wt. % |
| Propane | 0.5 wt. % |
| Propene | 1.95 wt. % |
| Isobutane | 53.89 wt. % |
| n-Butane | 0.11 wt. % |
| 1-Butene | 0.21 wt. % |
| Isobutene | 36.50 wt. % |
| trans-2-Butene | 0.29 wt. % |
| cis-2-Butene | 0.20 wt. % |
| 1,3-Butadiene | 0.16 wt. % |
| Hydrocarbons with >5 C atoms | 0.03 wt. % |
| H$_2$ | 2.74 wt. % |
| CO | 0.3 wt. % |
| IR Analysis | |
| Carbon | 1.93 wt. % |
| Conversion: | 46 [mol %] |
| Selectivity: | 82 [mol %] |
| Yield: | 38 [mol %] | c) Isobutane was dehydrogenated in the same apparatus as in (a), and again at 300 mbar, with reaction time 10 min, and catalyst loading 1 g isobutane per gram catalyst per hour, as in (a). However, here the temperature was 566° C.

The catalyst bed was comprised of pellets produced as follows:

The starting materials Cr$_2$O$_3$ (61.5 wt. %), melamine (0.5 wt. %) as a pore-former, and boehmite (3 wt. %) ("Pural SB", provided by the firm Condea) as a binder, were intermixed thoroughly in the dry state in the weight ratios stated below. 1 M formic acid was added to this mixture under constant stirring, with addition continuing until a kneadable mass was produced from which the initially moist catalyst pellets could be suitably prepared.

The molded bodies (pellets) were dried at 50° C. in a nitrogen stream for 2–5 hr, followed by calcining at 550° C. for 5 hr. The result was pellets comprised of Cr$_2$O$_3$ in the amount of 95 wt. % and boehmite in the amount of 5 wt. %.

The regeneration of the catalyst and the analyses of the reaction products were performed analogously to (a), supra.

Experiment cA (Comparison example)

Conventionally produced commercial Cr$_2$O$_3$:
Feed: Isobutane 99.9 wt. %.
Results of and IR analyses at the reactor outlet:

| GC Analysis | |
|---|---|
| Methane | 0.22 wt. % |
| Ethane | 0.02 wt. % |
| Ethene | 0.02 wt. % |
| Propane | 0.08 wt. % |
| Propene | 0.35 wt. % |
| Isobutane | 77.73 wt. % |
| n-Butane | 0.02 wt. % |
| Isobutene | 19.97 wt. % |
| trans-2-Butene | 0.07 wt. % |
| cis-2-Butene | 0.04 wt. % |
| $H_2$ | 1.22 wt. % |
| CO | 0.03 wt. % |
| IR Analysis | |
| Carbon | 0.25 wt. % |
| Conversion: | 22 mol % |
| Selectivity: | 93 mol % |
| Yield: | 20 mol % |

Experiment cB $Cr_2O_3$ produced by laser pyrolysis in nitrogen employed as a carrier gas:
Feed: Isobutane 99.9 wt. %.
Results of GC and IR analyses at the reactor outlet:

| GC Analysis | |
|---|---|
| Methane | 0.88 wt. % |
| Ethane | 0.22 wt. % |
| Ethene | 0.12 wt. % |
| Propane | 0.38 wt. % |
| Propene | 0.87 wt. % |
| Isobutane | 60.68 wt. % |
| n-Butane | 0.28 wt. % |
| 1-Butene | 0.43 wt. % |
| Isobutene | 31.38 wt. % |
| trans-2-Butene | 0.58 wt. % |
| cis-2-Butene | 0.40 wt. % |
| 1,3-Butadiene | 0.19 wt. % |
| Hydrocarbons with >5 C atoms | 0.04 wt. % |
| $H_2$ | 1.90 wt. % |
| CO | 0.28 wt. % |
| IR Analysis | |
| Carbon | 1.45 wt. % |
| Conversion: | 39 mol % |
| Selectivity: | 83 mol % |
| Yield: | 32 mol % |

Experiment cC $Cr_2O_3$ produced by laser pyrolysis in oxygen employed as a carrier gas:
Feed: Isobutane 99.9 wt. %.
Results of GC and IR analyses at the reactor outlet:

| GC Analysis | |
|---|---|
| Methane | 1.91 wt. % |
| Ethane | 0.56 wt. % |
| Ethene | 0.15 wt. % |
| Propane | 0.93 wt. % |
| Propene | 1.17 wt. % |
| Isobutane | 46.51 wt. % |
| n-Butane | 0.30 wt. % |
| 1-Butene | 0.30 wt. % |
| Isobutene | 39.37 wt. % |
| trans-2-Butene | 0.40 wt. % |
| cis-2-Butene | 0.27 wt. % |
| 1,3-Butadiene | 0.10 wt. % |
| Hydrocarbons with >5 C atoms | 0.03 wt. % |
| $H_2$ | 3.15 wt. % |
| $CO_2$ | 0.04 wt. % |
| CO | 1.08 wt. % |
| IR Analysis | |
| Carbon | 4.02 wt. % |
| Conversion: | 53 mol % |
| Selectivity: | 76 mol % |
| Yield: | 40 mol % |

Experiment cD $Cr_2O_3$ produced by laser pyrolysis in oxygen employed as a carrier gas. Pellets as in Experiment cC, but additionally impregnated with $KHCO_3$ solution:
Feed: Isobutane 99.9 wt. %.
Results of GC and IR analyses at the reactor outlet:

| GC Analysis | |
|---|---|
| Methane | 1.20 wt. % |
| Ethane | 0.79 wt. % |
| Ethene | 0.08 wt. % |
| Propane | 0.67 wt. % |
| Propene | 0.96 wt. % |
| Isobutane | 46.44 wt. % |
| n-Butane | 0.24 wt. % |
| Isobutene | 44.30 wt. % |
| trans-2-Butene | 0.30 wt. % |
| cis-2-Butene | 0.21 wt. % |
| 1,3-Butadiene | 0.10 wt. % |
| Hydrocarbons with >5 C atoms | 0.03 wt. % |
| $H_2$ | 2.56 wt. % |
| $CO_2$ | 0.14 wt. % |
| CO | 0.48 wt. % |
| IR Analysis | |
| Carbon | 2.05 wt. % |
| Conversion: | 53 mol % |
| Selectivity: | 86 mol % |
| Yield: | 46 mol % |

We claim:

1. A method which comprises catalytically dehydrogenating branched or unbranched, saturated or unsaturated hydrocarbons having 2-6 carbon atoms, or mixtures of such hydrocarbons, at a temperature of 300°-700° C. and a pressure of 0.1-20 bar, in the presence of a metal oxide powder comprising Cr (III) oxide, Ti (IV) oxide, V (V) oxide, or mixtures thereof, having a BET surface area of 5-50 m²/g and a mean particle diameter of 25-350 nm, having been prepared by continuous laser pyrolysis at a pressure of 10-1000 mbar of vaporized chromyl chloride, titanium tetrachloride, vanadyl chloride, or mixtures thereof, in the presence of a gas of hydrogen, nitrogen, sulfur hexafluoride, or oxygen, or a mixture of any of these gases with a noble gas, or in the presence of a noble gas.

2. The method according to claim 1, wherein said metal oxide powder comprises a mixture of at least two of Cr (III) oxide, Ti (IV) oxide, and V (V) oxide.

3. The method according to claim 1, wherein said metal oxide powder comprises Cr (III) oxide and V (V) oxide.

4. The method according to claim 1, wherein said metal oxide powder comprises Cr (III) oxide, Ti (IV) oxide and V (V) oxide.

5. The method according to claims 1, 2, 3 or 4 wherein hydrogen, steam, oxygen, or mixtures thereof, is present during the dehydrogenation.

6. The method which comprises catalytically dehydrogenating branched or unbranched, saturated or unsaturated hydrocarbons having 2-6 carbon atoms, or mixtures of such hydrocarbons, at a temperature of 300°-700° C. and a pressure of 0.1-20 bar, in the presence of a molded body comprising aluminum hydroxide in an amount of up to 90 wt. %, a metal oxide powder comprising Cr (II) oxide, Ti (IV) oxide, V (V) oxide, or mixtures thereof, having a BET surface area of 5–50 m²/g and a mean particle diameter of 25–350 nm, having been prepared by continuous laser pyrolysis at a pressure of 10–1000 mbar of vaporized chromyl chloride, titanium tetrachloride, vanadyl chloride, or mixtures thereof, in the presence of a gas of hydrogen, nitrogen, sulfur hexafluoride, or oxygen, or a mixture of any of these gases with a noble gas, or in the presence of a noble gas, and a binder.

7. The method according to claim 6, wherein said metal oxide powder comprises a mixture of at least two of Cr (III) oxide, Ti (IV) oxide and V (V) oxide.

8. The method according to claim 6, wherein said metal oxide powder comprises Cr (III) oxide and Ti (V) oxide.

9. The method according to claim 6, wherein said metal oxide comprises Cr (III) oxide and V (V) oxide.

10. The method according to claim 6, wherein said metal oxide comprises Cr (III) oxide, Ti (IV) oxide and V (V) oxide.

11. The method according to claims 6, 7, 8, 9, or 10, wherein hydrogen, steam, oxygen, or mixtures thereof, is present during the dehydrogenation.

* * * * *